United States Patent
Zhang et al.

(10) Patent No.: US 11,368,299 B2
(45) Date of Patent: *Jun. 21, 2022

(54) SELF-ENCRYPTION DRIVE (SED)

(71) Applicant: Marvell Asia Pte, Ltd., Singapore (SG)

(72) Inventors: Minda Zhang, Westford, MA (US); Ke Du, Fremont, CA (US)

(73) Assignee: Marvell Asia Pte, Ltd., Singapore (SG)

(*) Notice: Subject to any disclaimer, the term of this patent is extended or adjusted under 35 U.S.C. 154(b) by 276 days.

This patent is subject to a terminal disclaimer.

(21) Appl. No.: 16/708,203

(22) Filed: Dec. 9, 2019

(65) Prior Publication Data

US 2020/0186342 A1 Jun. 11, 2020

Related U.S. Application Data

(63) Continuation of application No. 16/708,085, filed on Dec. 9, 2019.
(Continued)

(51) Int. Cl.
*H04L 9/08* (2006.01)
*G06F 21/78* (2013.01)
*H04L 9/32* (2006.01)

(52) U.S. Cl.
CPC ............ *H04L 9/0891* (2013.01); *G06F 21/78* (2013.01); *H04L 9/083* (2013.01); *H04L 9/088* (2013.01);
(Continued)

(58) Field of Classification Search
CPC ..... H04L 9/0891; H04L 9/083; H04L 9/0863; H04L 9/0872; H04L 9/088; H04L 9/0894;
(Continued)

(56) References Cited

U.S. PATENT DOCUMENTS 8,370,648 B1 * 2/2013 Natanzon ............ G06F 12/1408
713/193
8,645,716 B1 2/2014 Dujari et al.
(Continued)

OTHER PUBLICATIONS

"A Deep Dive on End-to-End Encryption: How Do Public Key Encryption Systems Work?", Surveillance Self-Defense, 2018, 18 pages.
(Continued)

*Primary Examiner* — Dereena T Cattungal

(57) ABSTRACT

A self-encryption drive (SED) opens a communication session between the SED and a key management server. An identifier of the SED is sent to the key management server, where the identifier uniquely identifies a data structure in a database associated with the key management server and the data structure comprises a timestamp and a media encryption key (MEK). The data structure is received from the key management server, the data structure being wrapped with a shared session key associated with the communication session. The data structure is unwrapped with the shared session key and the MEK is stored only in the volatile memory of the SED based on the timestamp. Data is encrypted for storage in the non-volatile storage media of the SED based on the MEK stored only in the volatile memory of the self-encryption drive (SED). The MEK stored only in the volatile memory of the SED is erased to crypto-erase the SED.

16 Claims, 9 Drawing Sheets

Related U.S. Application Data

(60) Provisional application No. 62/777,659, filed on Dec. 10, 2018, provisional application No. 62/829,537, filed on Apr. 4, 2019, provisional application No. 62/934,701, filed on Nov. 13, 2019.

(52) U.S. Cl.
CPC .......... *H04L 9/0863* (2013.01); *H04L 9/0872* (2013.01); *H04L 9/0894* (2013.01); *H04L 9/3247* (2013.01); *H04L 9/3297* (2013.01); *H04L 2209/38* (2013.01)

(58) Field of Classification Search
CPC . H04L 9/3247; H04L 9/3297; H04L 2209/38; H04L 9/0822; H04L 9/3239; H04L 63/0428; H04L 9/0816; G06F 21/78; G06F 2221/2143; G06F 21/6218; G06F 12/1408; G06F 21/602; G06F 21/79; G06F 21/72; G06F 21/33; G06F 21/46; G11B 20/00224
USPC ......................................................... 713/193
See application file for complete search history.

(56) References Cited

U.S. PATENT DOCUMENTS

| | | | |
|---|---|---|---|
| 8,738,531 B1 | 5/2014 | Kalyadin et al. | |
| 9,304,941 B2 | 4/2016 | Kamath et al. | |
| 9,768,952 B1 | 9/2017 | Allo et al. | |
| 2009/0154705 A1* | 6/2009 | Price, III | ................ H04L 63/06 380/277 |
| 2012/0239943 A1 | 9/2012 | Okamoto | |
| 2013/0067242 A1 | 3/2013 | Lyakhovitskiy et al. | |
| 2013/0275775 A1 | 10/2013 | Fukawa et al. | |
| 2015/0052369 A1* | 2/2015 | Koning | ................... H04L 9/085 713/193 |
| 2015/0242657 A1* | 8/2015 | Kim | ....................... G06F 21/78 713/193 |
| 2015/0271161 A1 | 9/2015 | Katsuta | |
| 2016/0013945 A1* | 1/2016 | Offenberg | ............. H04L 9/3247 713/176 |
| 2016/0105429 A1 | 4/2016 | Boenisch et al. | |
| 2017/0012770 A1 | 1/2017 | Lin et al. | |
| 2017/0085374 A1* | 3/2017 | Chen | ....................... H04L 9/083 |
| 2017/0230179 A1* | 8/2017 | Mannan | ................ H04L 9/3247 |
| 2018/0121670 A1* | 5/2018 | Thibadeau, Sr | ...... H04L 9/0894 |
| 2018/0307869 A1* | 10/2018 | Bolotin | ............... H04W 12/068 |
| 2018/0359259 A1 | 12/2018 | Leon | |
| 2019/0065769 A1* | 2/2019 | Thibadeau, Sr. | ... G06F 21/6218 |
| 2019/0266103 A1* | 8/2019 | Pearson | ................ H04L 9/3239 |

OTHER PUBLICATIONS

"Open Trusted Technology Provider Standard (O-TTPS) Version 1.1", The Open Group, 2014, 44 pages.
"TCG Storage Architecture Core Specification", Trusted Computing Group, Incorporated, 2015, 306 pages.
"TCG Storage Interface Interactions Specification (SIIS)", Trusted Computing Group, Incorporated, 2018, 58 pages.
Cox, "Self-Encrypting Hard Drives: From Laptops to the Data Center", Storage Developer Conference, Santa Clara, 2009, 33 pages.
Hudson, et al., "KMIP Storage Array with Self-Encrypting Drives Profile Version 1.0.", OASIS Standard, 2015, 48 pages.
Office Action dated Mar. 15, 2021 corresponding to European Application No. 19214955.7, 4 pages.
European Search Report dated Mar. 18, 2020 corresponding to European Application No. 19214955.7, 4 pages.

\* cited by examiner

SELF-ENCRYPTION DRIVE (SED)

CROSS REFERENCE TO RELATED APPLICATION

This disclosure claims the benefit of priority under 35 U.S.C. § 120 as a continuation of U.S. application Ser. No. 16/708,085 filed Dec. 9, 2019 entitled "Self-Encryption Drive (SED)" which claims the benefit of priority under 35 U.S.C. § 119(e) of U.S. Provisional Application Ser. No. 62/934,701 filed Nov. 13, 2019, entitled "Method and Apparatus for Decommissioning a Hard Disk Drive", U.S. Provisional Application Ser. No. 62/829,537 filed Apr. 4, 2019, entitled "Self-Encryption Drive (SED) Architecture for Data Center", and U.S. Provisional Application Ser. No. 62/777,659 filed Dec. 10, 2018, entitled "Blockchain Based Decommissioning HDD/SDDs in Data Center", the contents each of which are incorporated herein by reference in its entirety.

FIELD OF USE

This disclosure generally relates to the field of data storage, and more particularly to a self-encryption drive (SED) which receives a media encryption key (MEK) from a key management server and stores the MEK on the SED only in volatile memory of the SED.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Trusted Computing Group (TCG) develops, defines and promotes open, vendor-neutral, global industry specifications and standards, supportive of security and trust services on storage drives such as self-encrypting drives (SED). The SED is a particular class of storage drives that stores data to non-volatile storage media of the SED in an encrypted format and/or decrypts data stored on the non-volatile storage media of the SED in the encrypted format. The encrypted format is typically a format which conceals the data by altering it so that it appears random.

A media encryption key (MEK) is used to encrypt data for storage on the non-volatile storage media and to decrypt encrypted data stored on the non-volatile storage media. The MEK is a string of bits which may be 128 or 256 bits long. The MEK is stored on the non-volatile storage media of the SED in an encrypted format. If a host computer is authenticated, then the SED decrypts the MEK stored on the non-volatile storage media in the encrypted format to a clear text format. The clear text format is typically a format which is not subject to encryption. The MEK in the clear text format allows for encrypting data received from the host computer for storage on the non-volatile storage media or for decrypting encrypted data stored on the non-volatile storage media. If the host is not authenticated, then the MEK stored on the non-volatile storage media in the encrypted format is not decrypted and no data is encrypted or decrypted.

Storing the MEK on non-volatile storage media even in an encrypted format poses several risks. There is a risk that the MEK stored on the non-volatile storage media could become corrupted, rendering the stored data inaccessible. Also, there is a risk that the SED could authenticate an unauthorized host computer and allow access to the data stored on the non-volatile storage media if the SED is lost or stolen.

Additionally, storing the MEK on the non-volatile storage media makes decommissioning of the SED difficult. The SED typically has a lifetime of 3 to 5 years before being decommissioned. National Institute of Standards and Technology (NIST) 800-88 guidelines require that all instances of the MEK on the SED be deleted or changed, i.e., the SED is crypto-erased, when the SED is decommissioned in order to protect the security of the encrypted data on the SED. Deleting or changing the MEK requires deleting or erasing every instance of the MEK on the non-volatile storage media. This becomes even difficult when the non-volatile storage media takes the form a solid-state drive (SSD), universal serial bus (USB) flash drive, or phase-change memory drive, for example. As the non-volatile storage media ages, different physical addresses of the non-volatile storage have different levels of storage reliability. The MEK is moved to those physical addresses that reliably store the MEK. The storage controller references the physical addresses where the MEK is stored using a logical address which translates to the various physical addresses where the MEK is stored on the non-volatile storage media over the lifetime of the SED. This means that storage controller needs to track the physical addresses where the MEK is stored over the lifetime of the SED so that all instances of the MEK are deleted or changed on the non-volatile storage media when the SED is decommissioned.

If the SED is not functional due to failure, then the MEK cannot be changed or deleted. Instead, the SED must be physically destroyed, and the destroyed SED disposed of, costing time and money. The destroyed SED also produces unnecessary waste which adds to environmental pollution. Further, destruction of SSDs, USBs, and phase change memory requires destroying semiconductor chips at a sufficiently fine granularity to ensure that the MEK stored on the semiconductor chips is destroyed.

In summary, storing the MEK on the non-volatile storage media of the SED even in the encrypted format poses security risks and adds extra expenses and efforts associated with decommissioning the SED.

SUMMARY

This disclosure relates to the field of data storage, and more particularly to a self-encryption drive (SED). The SED receives a media encryption key (MEK) from a key management server after a registration process and stores the MEK on the SED only in volatile memory of the SED. The MEK is used to encrypt data for storage on non-volatile media of the SED and decrypt data stored on the non-volatile media of the SED. Further, the MEK is automatically deleted from the volatile memory when the SED is no longer powered, improving security of the encrypted data stored on non-volatile storage media because the SED does not have the MEK.

Aspects of the disclosure provide a method for storing a media encryption key (MEK) in a self-encryption drive (SED) and crypto-erasing the self-encryption drive (SED) by deleting all instances of the media encryption key (MEK) stored by the self-encryption drive (SED), wherein the self-encryption drive (SED) comprises (i) a volatile memory and (ii) non-volatile storage media, the method comprising: opening a communication session between the self-encryption drive (SED) and a key management server; sending an identifier of the self-encryption drive (SED) to a key management server, wherein the identifier uniquely identifies a data structure in a database associated with the key management server, wherein the data structure comprises a timestamp and the media encryption key (MEK); receiving the data structure from the key management server, the data structure being wrapped with a shared session key associated with the communication session; unwrapping the data structure with the shared session key; storing the media encryption key (MEK) only in the volatile memory of the self-encryption drive (SED) based on the timestamp; encrypting data for storage in the non-volatile storage media of the self-encryption drive (SED) based on the media encryption key (MEK) stored only in the volatile memory of the self-encryption drive (SED); and erasing the media encryption key (MEK) stored only in the volatile memory of the self-encryption drive (SED) to crypto-erase the self-encryption drive (SED).

In one example, unwrapping the data structure with the shared session key comprises verifying in the data structure a digital signature signed with a key management server signing key. In another example, the method comprises unwrapping the MEK stored in the data structure with a unique data secret (UDS) associated with the SED. In yet another example, the stored MEK in the volatile memory of the SED is wrapped with a wrapping key based on a password of a user of the SED and unwrapped with the wrapping key when the user provides the password to the SED. In another example, unwrapping the data structure with the shared session key comprises determining, by the SED, the shared session key based on a key management server public key received from the key management server, an SED private key, and a random salt. In yet another example, the timestamp corresponds to a time when the key management server sends the data structure to the SED. In another example, the method further comprises determining whether a difference between the timestamp associated with the MEK and another timestamp is less than a certain duration and wherein storing the MEK only in the volatile memory of the SED comprises storing the MEK if the difference is less than the certain duration. In yet another example, the method further comprises accessing a block chain which stores an indication of whether the SED is decommissioned and wherein storing the MEK on the SED only in the volatile memory of the SED comprises storing the MEK only in the volatile memory of the SED if the indication indicates that the SED is not decommissioned.

Aspects of the disclosure provide a non-transitory computer-readable medium storing instructions for storing a media encryption key (MEK) in a self-encryption drive (SED) and crypto-erasing the self-encryption drive (SED) by deleting all instances of the media encryption key (MEK) stored by the self-encryption drive (SED), wherein the self-encryption drive (SED) comprises (i) a volatile memory and (ii) non-volatile storage media, the instructions when executed by one or more processors, cause the one or more processors to at least: open a communication session between the self-encryption drive (SED) and a key management server; send an identifier of the self-encryption drive (SED) to a key management server, wherein the identifier uniquely identifies a data structure in a database associated with the key management server, wherein the data structure comprises a timestamp and the media encryption key (MEK); receive the data structure from the key management server, the data structure being wrapped with a shared session key associated with the communication session; unwrap the data structure with the shared session key; store the media encryption key (MEK) only in the volatile memory of the self-encryption drive (SED) based on the timestamp; encrypt data for storage in the non-volatile storage media of the self-encryption drive (SED) based on the media encryption key (MEK) stored only in the volatile memory of the self-encryption drive (SED); and erase the media encryption key (MEK) stored only in the volatile memory of the self-encryption drive (SED) to crypto-erase the self-encryption drive (SED).

In one example, the instructions to unwrap the data structure with the shared session key comprises instructions to verify a digital signature in the data structure signed with a key management server signing key. In another example, the non-transitory computer-readable medium further comprises instructions to unwrap the MEK stored in the data structure with a unique data secret (UDS) associated with the SED. In yet another example, the stored MEK in the volatile memory of the SED is wrapped with a wrapping key based on a password of a user of the SED and unwrapped with the wrapping key when the user provides the password to the SED. In another example, the instructions to unwrap the data structure with the shared session key comprises instructions to determine, by the SED, the shared session key based on a key management server public key received from the key management server, a SED private key, and a random salt. In another example, the timestamp corresponds to a time when the key management server sends the data structure to the SED. In yet another example, the non-transitory computer-readable medium further comprises instructions to determine whether a difference between the timestamp associated with the MEK and another timestamp is less than a certain duration and wherein the instructions to store the MEK only in the volatile memory of the SED comprises instructions to store the MEK if the difference is less than the certain duration.

Aspects of the disclosure provide a self-encryption drive (SED) arranged to store a media encryption key (MEK) in a self-encryption drive (SED) delete all instances of a media encryption key (MEK) stored by the self-encryption drive (SED) to crypto-erase the self-encryption drive (SED), the self-encryption drive (SED) comprising: a volatile memory; a non-volatile storage media; instructions stored in memory of the self-encryption drive (SED), when executed by one or more processors of the self-encryption drive (SED), cause the self-encryption drive (SED) to at least: open a communication session between the self-encryption drive (SED) and a key management server; send an identifier of the self-encryption drive (SED) to a key management server, wherein the identifier uniquely identifies a data structure in a database associated with the key management server, wherein the data structure comprises a timestamp and the media encryption key (MEK); receive the data structure from the key management server, the data structure being wrapped with a shared session key associated with the communication session; unwrap the data structure with the shared session key; store the media encryption key (MEK) only in the volatile memory of the self-encryption drive (SED) based on the timestamp; encrypt data for storage in the non-volatile storage media of the self-encryption drive (SED) based on the media encryption key (MEK) stored only in the volatile memory of the self-encryption drive (SED); and erase the media encryption key (MEK) stored only in the volatile memory of the self-encryption drive (SED) to crypto-erase the self-encryption drive (SED).

In one example, the identifier is a physical security identification pin (PSID) associated with the SED. In another example, the instructions to unwrap the data structure with the shared session key comprises instructions to verify a digital signature in the data structure signed with a key management server signing key. In yet another example, the timestamp corresponds to a time when the key management server sends the data structure to the SED. In another example, the SED further comprises instructions to determine whether a difference between the timestamp associated with the MEK and another timestamp is less than a certain duration and wherein the instructions to store the MEK only in the volatile memory of the SED comprises instructions to store the MEK if the difference is less than the certain duration.

Figure 1:
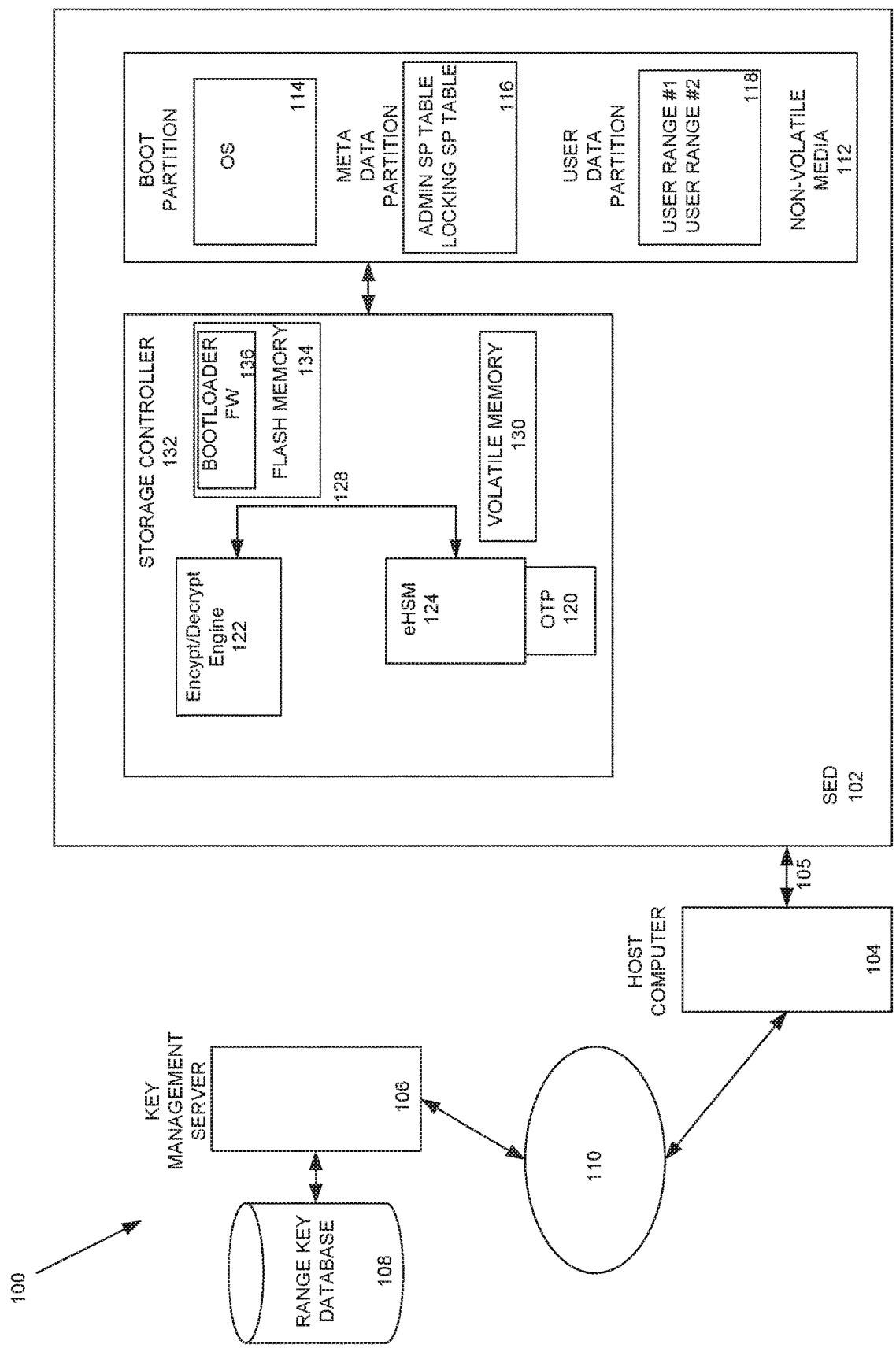
FIG. 1 is a block diagram of an example self-encryption drive (SED) arranged in a data center.

The drawings are for the purpose of illustrating example embodiments, but it is understood that the embodiments are not limited to the arrangements and instrumentality shown in the drawings.

DETAILED DESCRIPTION

This disclosure provides examples and details related to a self-encryption drive (SED). The SED receives a protected media encryption key (MEK) from a key management server via a host computer connection and stores the MEK on the SED only in volatile memory. For example, the MEK is not stored on non-volatile storage media of the SED. The encrypted data on the non-volatile storage media is secure because the MEK in the volatile memory is deleted when the SED is no longer powered and the SED does not have the MEK to decrypt the encrypted data. In some examples, the SED may take the form of a hard disk drive (HDD), solid-state drive (SSD), or universal serial bus (USB) flash drive. The principles described herein may apply to these different forms of storage.

Example Architecture

FIG. 1 is a block diagram 100 of an example self-encryption drive (SED) 102 arranged in a data center. The block diagram 100 includes a host computer 104, the SED 102, a key management server 106, and a range key database 108 coupled together by a communication network 110 such as a local area network (LAN) or wide area network (WAN).

In examples, one or more of the SED 102, the host computer 104, the key management server 106, and the range key database 108 arranged in the data center provide on-demand computer system resources, especially data storage.

The host computer 104 may be a computer, server, a smart phone, tablet, computer, laptop etc. in the data center. The host computer 104 may be coupled to the SED 102 to facilitate storage of data to the SED 102 via a connection 105 such as a Serial Advanced Technology Attachment (SATA), Peripheral Component Interconnect Express (PCIe), Small Computer System Interface (SCSI), as well as a network switch routing to the SED 102 over a storage area network (SAN). In some examples, the host computer 104 may also power the SED 102.

The key management server 106 may facilitate transmission and reception of protected media encryption keys (MEKs) such as cryptographic keys for encrypting and decrypting data stored on the SED 102. The MEK may be a string of bits which may be 128 or 256 bits long, for example, which serves as a code to transform encrypted data to data in a clear text format and vice versa. The key management server 106 may operate in accordance with a key management interoperability protocol (KMIP) which defines message formats for transmission of the MEK to the SED 102, reception of the MEK from the SED 102, and manipulation of the MEK.

The range key database 108 may have storage for storing the MEK. In examples, the key management server 106 may be coupled to the range key database 108 to facilitate the storage of the MEK in the range key database 108. The range key database 108 is illustrated as a separate system to the key management server 106 but in some examples functionality of both may be integrated into a single system.

The SED 102 may be a particular class of storage drives that stores data to non-volatile storage media 112 of the SED 102 in an encrypted format and/or decrypts data stored on the non-volatile storage media 112 of the SED 102 in the encrypted format. The encrypted format is typically a format which conceals the data by altering the data so that the data appears random. The non-volatile storage media 112 may be storage media on the SED 102 which persistently stores data even when power is removed from the SED 102 such as encrypted data. The non-volatile storage media 112 may take many forms. For example, if the SED 102 is a hard disk drive (HDD), then the non-volatile storage media 112 may be a magnetic disk. As another example, if the SED 102 is a solid state drive (SSD) or universal serial bus (USB), then the non-volatile storage media 112 may be a non-volatile memory such as Not AND (NAND) memory, Not OR (NOR) memory, or phase change memory.

The non-volatile storage media 112 may include multiple partitions 114-118 including a boot partition 114, a user data partition 118, and a metadata partition 116. The boot partition 114 may include an operating system (OS) associated with booting up the host computer 104. The user data partition 118 may store data associated with one or more users of the SED 102. Each user may be assigned a number of ranges addressed by logical blocks addresses (LBA) or some other identifier of storage locations in the non-volatile storage media 112 where the user may be able to store data, referred to as a range. The user data partition 118 is shown to have ranges associated with two users, user 1 and user 2, but the user data partition 118 may include more or less ranges. In examples, multiple users may be assigned a same range or unique ranges. The metadata partition 116 may include an admin service provider (SP) table and a locking service provider (SP) table. The admin service provider table may store passwords in an encrypted format for an administrator of the SED who controls which users may access the SED 102. The locking service provider table may identify the ranges of the non-volatile storage media 112 associated with each user of the SED 102.

The SED 102 may further have an encryption decryption engine 122, an embedded hardware security module (eHSM) 124, volatile memory 130, one-time programmable memory (OTP) 120, and flash memory 134. One or more of the encryption decryption engine 122, the embedded hardware security module (eHSM) 124, the volatile memory 130, the one-time programmable memory 120, and/or the flash memory 134 may be implemented by a processor which executes computer instructions (e.g., firmware) stored in the flash memory 134 or any other suitable type of hardware and/or software to perform functions described herein.

The encryption decryption engine 122 may perform encryption and decryption functions. Encryption is generally the process of translating data in a clear text format into encrypted data. The encrypted data conceals the data by altering the data so that the data appears random while the clear text format is not subject to encryption. Decryption is the process of converting the encrypted data back into the data in the clear text format. The encryption decryption engine 122 may encrypt data in the clear text format for storage on the non-volatile storage media 112 and decrypt encrypted data stored on the non-volatile storage media 112. In examples, the encryption decryption engine 122 may conform to an advanced encryption standard (AES) which defines a symmetric key algorithm for data encryption and data decryption handling blocks sized at 128, 192, or 256 bits.

The eHSM 124 may control security of the encrypted data on the non-volatile storage media 112 of the SED 102. In one example, the eHSM 124 may generate the MEK to encrypt data for storage on the non-volatile storage media 112 and decrypt data stored on the non-volatile storage media 112. In another example, the eHSM 124 may securely provide the MEK to the key management server 106 for storage in the range key database 108. In yet another example, the eHSM 124 may securely receive the MEK stored in the range key database 108 from the key management server 106. In another example, the eHSM 124 may securely provide the MEK to the encryption decryption engine 122 to encrypt data to the non-volatile storage media 112 and decrypt data stored on the non-volatile storage media 112. In some examples, the eHSM 124 may securely provide the MEK to the encryption decryption engine 122 by way of a dedicated communication path 128 between the eHSM 124 and the encryption decryption engine 122.

The MEK may be stored on the SED 102 only in volatile memory 130 on the SED 102 and not conventionally stored on the non-volatile storage media 112. The volatile memory 130 may be storage which requires power to maintain the stored information such as random access memory (RAM) and which can be read, written to, and erased multiple times; the volatile memory 130 retains the stored information while powered on but when the power is interrupted, the stored data is lost. In examples, the volatile memory 130 may store the MEK for the encryption decryption engine 122 to encrypt data in the clear text format to encrypted data and decrypt the encrypted data to the clear text format. The volatile memory 130 may be accessible to the encryption decryption engine 122 and eHSM 124 even though the volatile memory 130 is shown as separate to the encryption decryption engine 122 such as a system buffer. In other examples, at least a portion of the volatile memory 130 may be located in the encryption decryption engine 122 and eHSM 124.

In examples, the MEK may be associated with a range of the non-volatile storage media 112 and also referred to herein as a range key. The range key may be used to encrypt and/or decrypt data for a range in the non-volatile storage media 112. In this case, multiple MEKs may be associated with the SED 102, each associated with encrypting and/or decrypting data in a certain range. The MEK which is used to encrypt the data for the range is stored in the volatile memory 130 of the SED 102. The MEK is not stored in the non-volatile storage media 112 and specifically not in the locking service provider table in the metadata partition 116 on the non-volatile storage media 112

The OTP 120 is a type of semiconductor memory which can only be written to once (e.g., by blowing fuses) and that can retrieve stored information even after having been power cycled. In examples, the OTP 120 may store an identification of the SED 102 and a unique device secret (UDS). The identification may be a physical security ID pin (C_PIN_PSID) to uniquely identify the SED and may have been stored in the OTP 120 during a manufacture of the SED 102. In examples, the C_PIN_PSID may match the C_PIN_PSID on a label affixed on the SED 102. The UDS may be a cryptographic key and may have been stored in the OTP 120 during a manufacture of the SED 102.

The flash memory 134 may be a form of non-volatile memory such as NAND or NOR memory for storing firmware (FW) associated with the SED 102. The firmware may include bootloader firmware 136 associated with operating one or more of the encryption decryption engine 122 and the eHSM 124. The flash memory 134 may include other firmware but the MEKs will not be stored in the flash memory 134.

In some examples, one or more of the encryption decryption engine 122, the volatile memory 130, the eHSM 124, the OTP 120, and the flash memory 134 may define a storage controller 132 of the SED 102. The storage controller 132 may include other components which are not shown for clarity purposes associated with storage of data on the non-volatile storage media 112.

Example Operations

Figure 2:
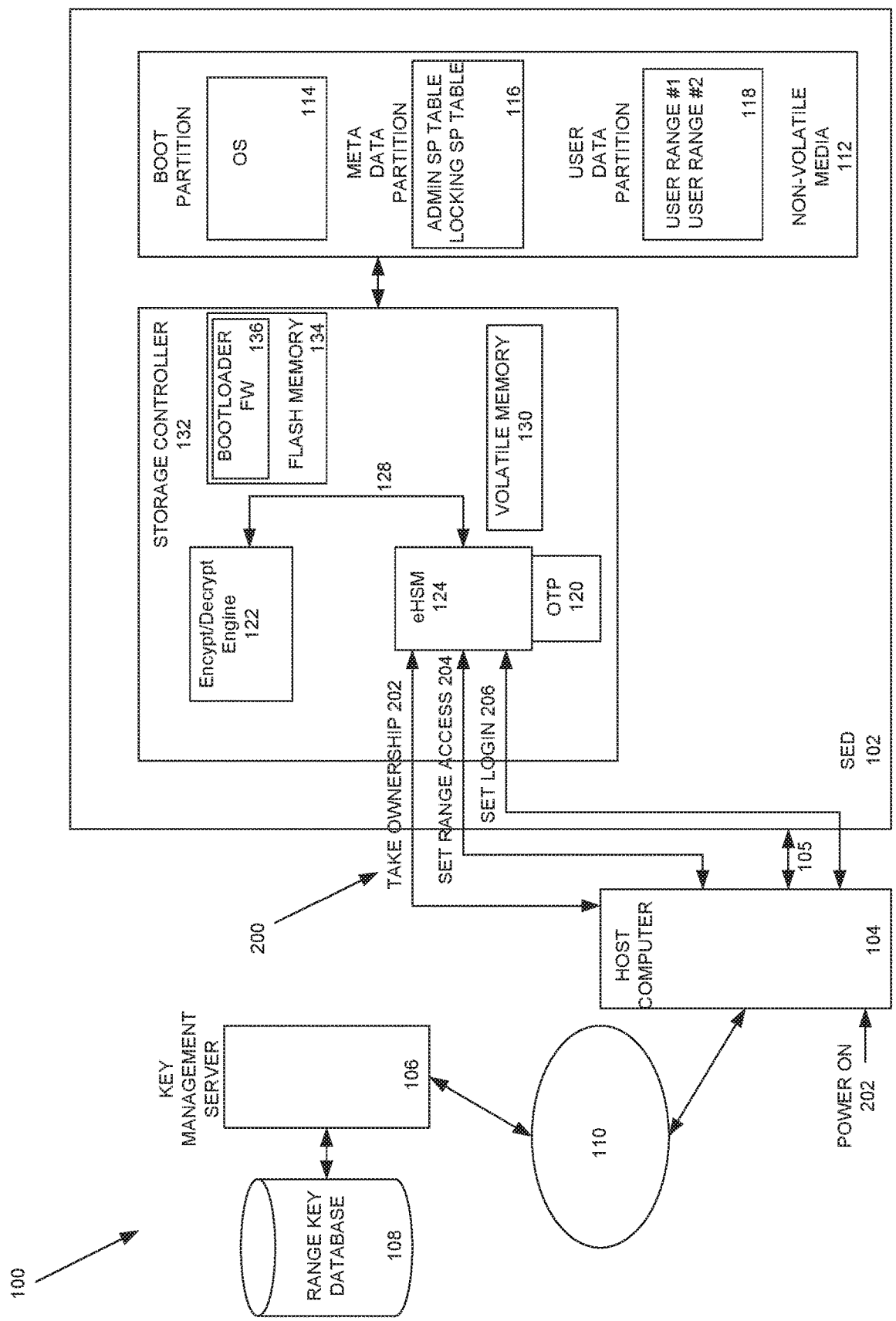
FIG. 2 illustrates an example initialization process between a host computer and the SED.

FIG. 2 illustrates an example initialization process 200 between the host computer 104 and the SED 102 to configure the SED 102. The initialization process 200 is based on a Trusted Computing Group (TCG) protocol performed between the eHSM 124 and the host computer 104. The initialization process 200 may be implemented by one or more of hardware, software, or a combination of hardware and software. Further, the initialization process 200 shown in FIG. 2 includes certain components similar to that described in FIG. 1. The description of these components has been provided above and will be omitted here for clarity purposes.

At 202, the host computer 104 is powered on. The power-on may cause the storage controller 132 to be also powered on to load the bootloader firmware 136 into one or more of the eHSM 124 and encryption decryption engine 122.

At 204, ownership of the SED 102 is taken. An administrator of the SED 102 may store an administrator password in the admin service provider table (AdminSP Table) of the metadata partition 116 on the non-volatile storage media 112 to control access to the SED 102 by one or more users. In examples, the administrator may set this password if the SED 102 has not been previously accessed by any administrator or this password is reset. Additionally, taking ownership may include deriving a public key and private key for the SED 102. The private key and public key may be cryptographic keys associated with the SED 102, where the public key may be shared outside of the SED 102 and the private key may not be shared outside of the SED 102.

The eHSM 124 may derive the public key and private key based on data stored in the OTP 120 such as the C_PIN_PSID and the UDS to generate the public and private key for the SED 102. For example, the UDS and C_PIN_PSID stored in the OTP 120 may be applied to a function such as a device identifier composition engine (DICE) in the eHSM 124 to generate a compound device indicator (CDI). A password based key derivation function (PBKDF) in the eHSM 124 determines a private key for the SED based on the CDI: PBKDF(CDI)=SED_PrivKey for an elliptic curve (EC) cryptographic algorithm. Then the private key is used to derive the public key for the SED based on a public key derivation PubKey_Derivation: PubKey_Derivation(SED_PrivKey)=SED_PubKey for the EC cryptographic algorithm. The private and public key of the SED may be used to encrypt/decrypt the administrator password for storage in the admin service provider table of the metadata partition 116 in the non-volatile storage media 112. In other examples, one or more of the SED_PrivKey and SED_PubKey may be generated by the key management server 106 or other systems and provided to the SED 102, instead of or in addition to the eHSM 124 generating the private key and/or public key. In examples, the SED_PrivKey and SED_PubKey may be stored in the OTP 120.

At 204, a range access is assigned to a user of the SED 102. The range access may identify LBAs or some other identifier of storage where the user may able to store data in the non-volatile storage media 112. In some examples, the SED 102 may support between 32 to 128 unique ranges and each user may be assigned one or more ranges.

At 206, a login for the user is established. For example, the administrator may assign a default password to the user which is stored in the admin service provider of the metadata partition 116 of the non-volatile storage media 112. The user may then provide this default password to the SED to access the range associated with the user. The private and/or public key of the SED 102 may be used to encrypt/decrypt the default password in the admin service provider similar to the administrator password.

The SED 102 may support a plurality of users. In examples, the initialization process 200 and steps 202-206 may be repeated one or more times to associate each user with a range in the non-volatile storage media 112. Each range may store encrypted data on the non-volatile storage media 112 of the SED 102 for a respective user.

Figure 3:
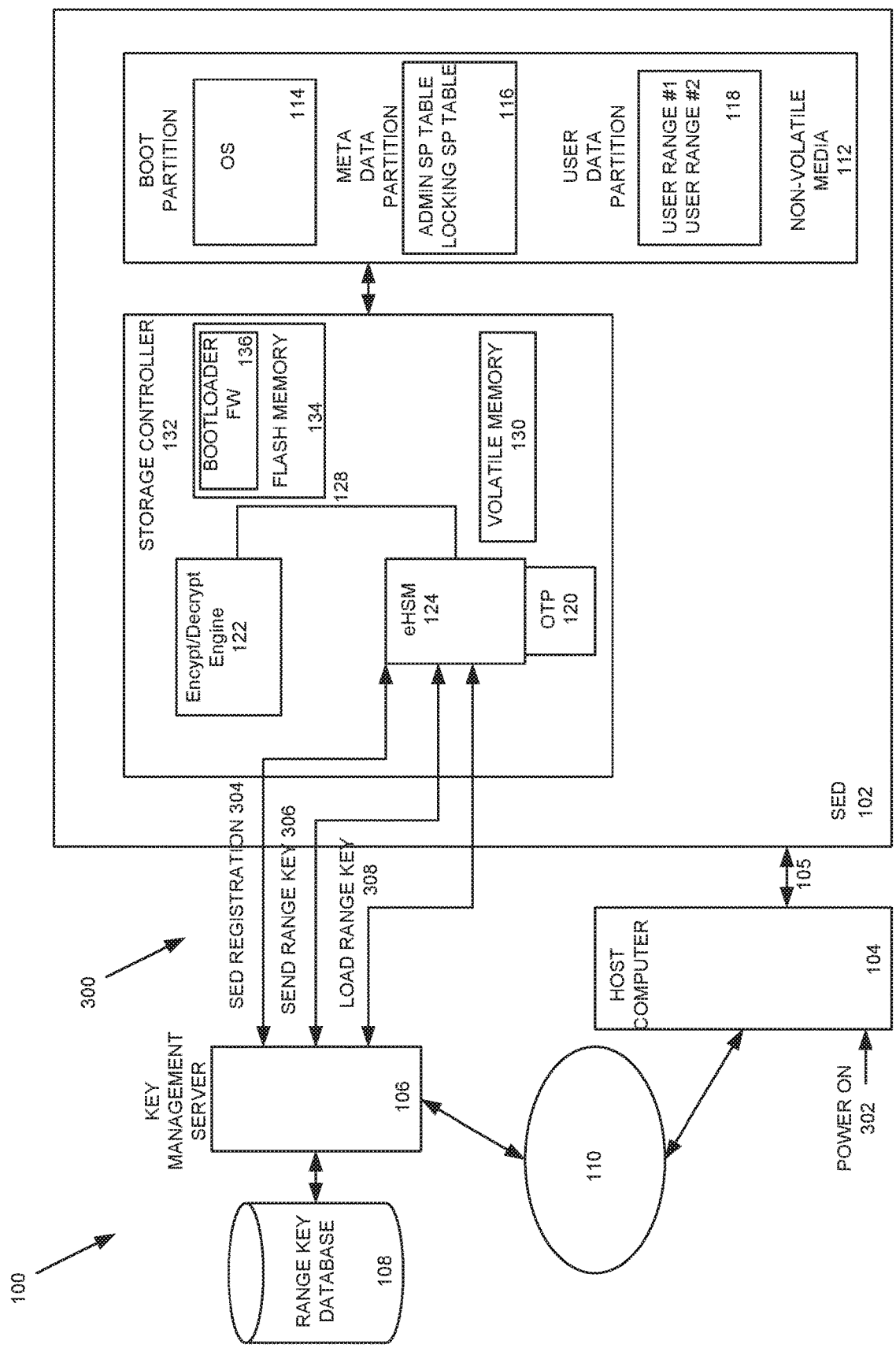
FIG. 3 illustrates an example registration process for associating a media encryption key (MEK) with a range assigned during the initialization process to facilitate encrypting data for storage in the range and decrypting stored data in the range.

FIG. 3 illustrates an example registration process 300 for associating an MEK with a range assigned during the initialization process to facilitate encrypting data for storage in the range and decrypting data in the range for a user. Further, the MEK may be stored on the SED 102 only in volatile memory 130. By storing the MEK on the SED 102 only in the volatile memory 130, the encrypted data on the non-volatile storage media 112 is secure because the MEK in the volatile memory 130 is deleted when the SED 102 is no longer powered. The SED 102 does not have the MEK to decrypt the encrypted data on the non-volatile storage media 112.

The registration process 300 may include communication between the key management server 106 and eHSM 124 of the SED 102 and implemented by one or more of hardware, software, or a combination of hardware and software. The communication is shown as steps 302-308 directly between the key management server 106 and the eHSM 124 for ease of illustration, but in examples, the communication may occur via the host computer 104. Further, the registration process 300 shown in FIG. 3 includes certain components similar to those described with respect to FIG. 1. The description of these components has been provided above and will be omitted here for clarity purposes.

At 302, the host computer 104 is powered on which causes the host computer 104 to boot up. The host computer 104 may boot up via the OS in the boot partition 114 on the non-volatile storage media 112 of the SED 102. The power-on may also cause the storage controller 132 to be also powered on to load the bootloader firmware 136 into one or more of the eHSM 124 and encryption decryption engine 122. The host computer 104 may facilitate the communication between the SED 102 and the key management server 106.

At 304, the SED 102 registers with the key management server 106. The registration may comprise the key management server 106 allocating a data structure in the range key database 108 to store one or more range keys associated with the one or more users of the SED 102.

At 306, an MEK is sent from the eHSM 124 to the key management server 106 for storage in the range key database 108. The MEK may be wrapped for transmission based on one or more of a cryptographic key derived from the password of the user associated with the range key (e.g., PBKDF) and the UDS. The wrapped MEK may be also encrypted with a shared session key held by both the SED 102 and the key management server 106 which is associated with a communication session between the SED and key management server 106.

At 308, the MEK from range key database 108 is loaded into the volatile memory 130. The MEK may be loaded into the volatile memory 130 from the range key database 108 after boot up of the SED 102 after being powered off if the MEK was previously sent to the key management server 106 for storage in the range key database 108. The loaded MEK allows the SED 102 to encrypt data for storage in the range associated with the MEK and decrypt data stored in the range associated with the MEK. The loading of the MEK includes storing the MEK on the SED 102 only in the volatile memory 130 so that if the SED 102 is no longer powered, the MEK is erased from the SED 102, resulting in a crypto-erase of the SED 102, i.e., no MEKs are stored on the SED 102 in either clear text or encrypted form. Because the MEK is not stored on the non-volatile storage media 112, the encrypted data stored on the non-volatile storage media 112 is secure when the SED 102 is powered off.

Figure 4:
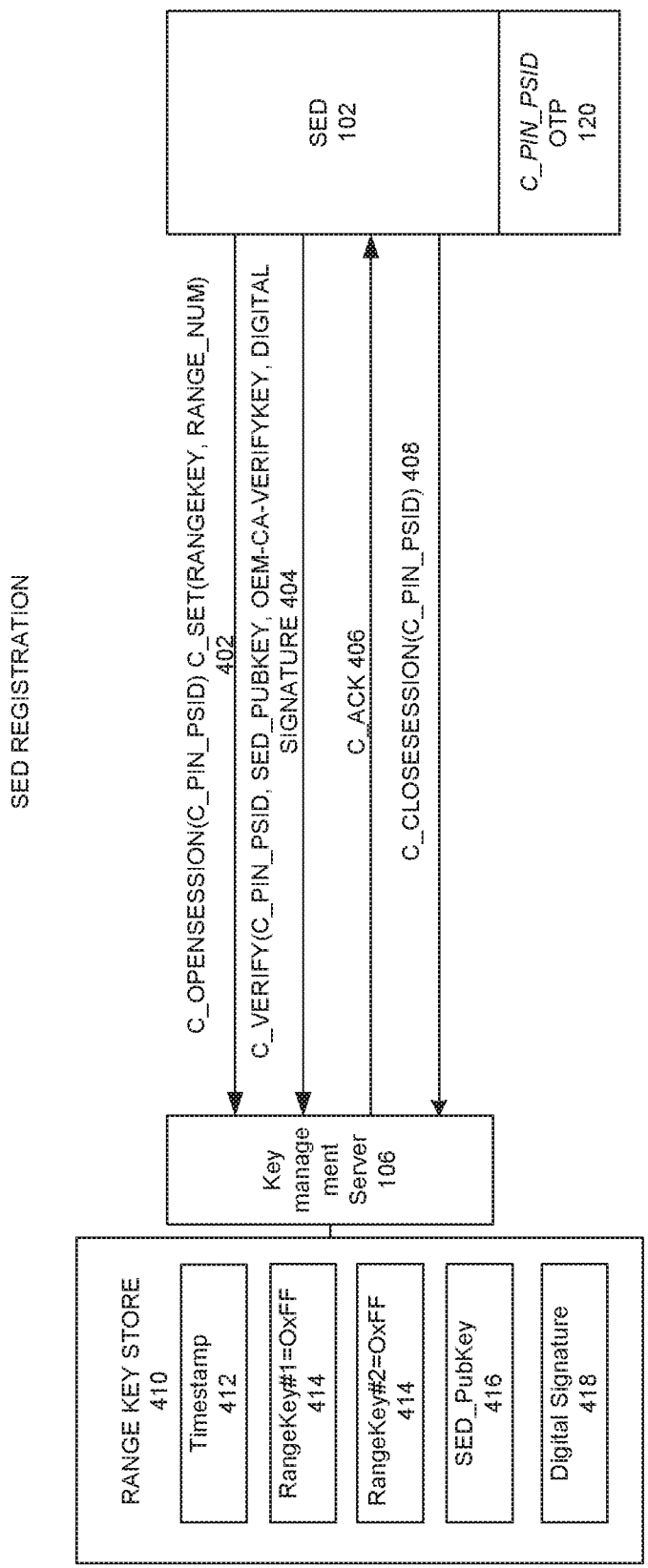
FIG. 4 illustrates example details of the registration process when the SED registers with the key management server.

FIG. 4 illustrates example details of the registration process when the SED 102 registers with the key management server 106. The process may include communication between the key management server 106 and the eHSM 124 which relates to at least step 304 in FIG. 3 and is implemented by one or more of hardware, software, or a combination of hardware and software.

At 402, a request is sent from the SED 102 to the key management server 106 to open a secure communication session over the communication network 110 between the SED 102 and the key management server 106. The request identifies various information associated with allocating a data structure in the range key database 108 to store one or more range keys for the SED 102. The information may include the C_PIN_PSID of the SED 102 to identify the SED 102, an indication that an MEK in the form of a range key RangeKey will be used to encrypt and decrypt data on the SED 102, and/or a number of ranges supported by the SED 102 indicated by Range_num. The communication session is then opened.

At 404, the C_PIN_PSID, the SED_PubKey, an OEM-CAVerifyKey, and a DigitalSignature are sent from the eHSM 124 to the key management server 106. The C_PIN_PSID and SED_PubKey are described above. The OEM-CAVerifyKey may be a public key associated with a certificate authority (CA) server of an original equipment manufacturer (OEM) of the SED 102 and a digital certificate of the OEM maintained by a certificate authority (CA) which issues the digital certificate and certifies ownership of the OEM-CAVerifyKey. The C_PIN_PSID and SED_PubKey which are sent may be signed by an OEM CA signing key to generate the digital signature. The DigitalSignature may be used to verify the C_PIN_PSID and SED_PubKey of the SED 102 associated with the received OEM-CAVerifyKey. The OEM-CAVerifyKey can be verified by the key management server 106 either through inquiry directly for a trusted OEM CA server in the network, or can be checked against a pre-provisioned value. Based on this verification, the key management server 106 may confirm that the SED 102 sent the C_PIN_PSID and SED_PubKey. The key management server 106 may allocate data structure 410 in the range key database 108 which is uniquely identified by the C_PIN_PSID in the range key database 108. The data structure 410 also referred to as a range key store may include one or more of a timestamp slot 412, a number of range key slots 414 which may be equal to or greater than Range_num, a public key slot 416, and a digital signature slot 418. In examples, a time stamp indicating a time, e.g., counter value, when the data structure 410 was allocated may be stored in the timestamp slot 412. The timestamp may be provided by the SED 102 during the communication session based on a timer counter register associated with the storage controller 132 or obtained from a trusted third party such as a time stamp authority (TSA) server as specified by RFC3161 published by the Internet Society. In some examples, the timer counter register may be a register in the volatile memory 130 and the TSA server may be remote to the SED 102 and/or the key management server 106. The range key slots 414 may store the range key for each user range and may be initially assigned with an undefined range key such as 0xFF. In this regard, the timestamp as described in further detail below may be used to determine a validity of the range keys stored in the range key slots 414. The public key slot 416 may store the SED_PubKey verified by the key management server 106. The digital signature slot 418 may include the digital signature of the key management server 106 which is signed with a key management server signing key associated with the key management server 106 based on the information in slots 412-416.

At 406, the key management server 106 sends an indication that the data structure 410 on the range key database 108 was successfully allocated.

At 408, the SED 102 closes the communication session with the key management server 106. The SED 102 may close the communication session after the data structure 410 is successfully allocated or the Digital Signature is not verified. The communication session may be closed for other reasons as well.

Figure 5:
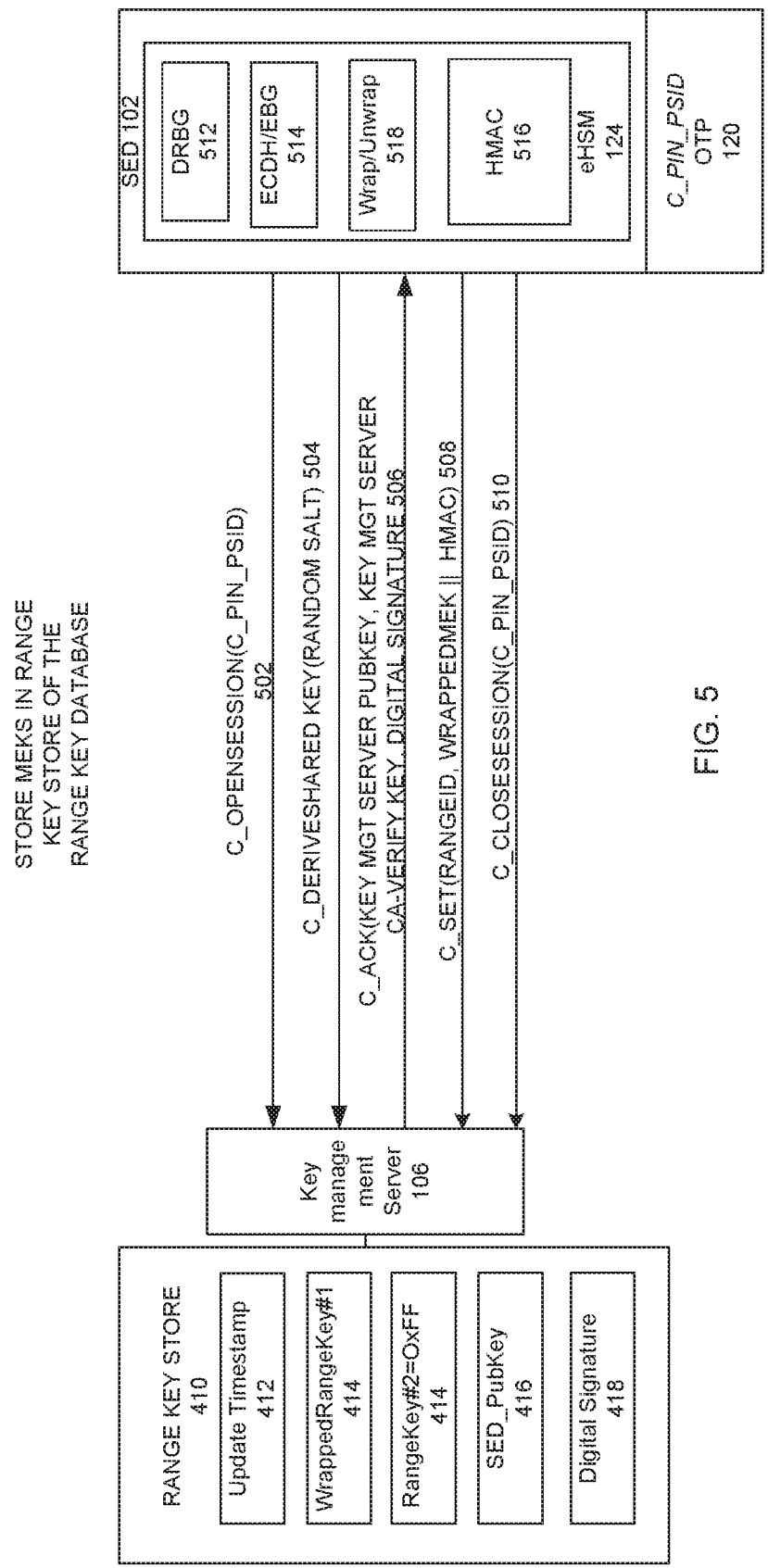
FIG. 5 illustrates example details for providing the MEK from the SED to the key management server for storage in a range key database.

FIG. 5 illustrates example details for providing the MEK from the SED 102 to the key management server 106 for storage in the range key database 108. The process may include communication between the key management server 106 and the SED 102 which relates to at least step 306 in FIG. 3 and is implemented by one or more of hardware, software, or a combination of hardware and software.

At 502, a request is sent from the SED 102 to the key management server 106 to open a secure communication session over the communication network 110 between the SED 102 and the key management server 106. The request may include the C_PIN_PSID of the SED 102 to identify the SED 102. The communication session is then opened.

At 504, a shared key generation request is sent from the SED 102 to the key management server 106 with a random salt. The random salt may be a random number which is generated for the communication session and may change for another communication session. Using Elliptic curve Diffie Hellman (ECDH) or some other shared key generation algorithm, the key management server 106 may generate a shared key for secure communication over the communication session based on the key management server private key and the SED_PubKey. The key management server public key, the key management server private key, as well as the C_PIN_PSID for the SED 102 may be already available to the key management server 106 in the range key database 108 and the data structure 410 in the range key database 108 may store the SED_PubKey for the SED 102. The key management server 106 may use the received C_PIN_PSID to access the data structure 410 and obtain the SED_PubKey for generating the shared key. The generated shared key may further be transformed into a session shared key for the communication session, using a key derivative function (KDF) with the received random salt the KDF could be a Keyed-Hashing for Message Authentication (HMAC) operation to process the shared key using the random salt as the HMAC key, as an example.

At 506, the key management server 106 may send an acknowledgement back to the SED 102. The acknowledgement may include the key management server public key, a key management server CA verify key, and a digital signature of the key management server public key signed by the key management server CA signing key. The eHSM 124 may verify the key management server public key was sent by the key management server 106 by verifying the digital signature using the received key management server CA verify key and computing its hash digest in comparison with a pre-provisioned digest value stored in the SED non-volatile storage media 112 or OTP 120. Using an Elliptic curve Diffie Hellman (ECDH) algorithm 514 of the eHSM 124 or some other key generation algorithm on the random salt which was sent by the SED 102, the eHSM 124 may generate the same shared session key as the one generated by the key management server 106 for the communication session. The shared session key may be based on the key management server public key, the SED_PrivKey, and the random salt. The shared session key may be the same as the shared session key generated by the key management server 106 to enable the secure communications over the communication session.

The eHSM 124 may generate an MEK to encrypt or decrypt a range. This MEK associated with a range may be referred to also as a range key. The MEK may be generated by a random number generator such as a deterministic random bit generator (DRBG) 512 of the eHSM 124 and seeded by a hardware true entropy bit generate (EBG). The MEK may be wrapped, e.g., encrypted, by a key generated by a PDKDF using the password of the user associated with the range key to produce the wrapped MEK, i.e., wrapped range key, and in some cases further wrapped, e.g., encrypted, by the UDS. The eHSM 124 may have a wrapping/unwrapping function 518 to support the wrapping. In examples, Keyed-Hashing for Message Authentication (HMAC) 516 of the eHSM 124 may compute a hash for the wrapped MEK to check integrity of the wrapped MEK, e.g., no bits in error. The shared session key associated with the communication session may be used to encrypt the wrapped MEK along with the hash.

At 508, the wrapped MEK along with the hash may be sent from the SED 102 to the key management server 106 with an identification of the range associated with the wrapped MEK. The key management server 106 may decrypt the wrapped MEK based on the shared session key generated by the key management server 106. Further, the key management server 106 may use an HMAC associated with the key management server 106 to verify that the wrapped MEK matches the received hash. If the received hash is verified, then the wrapped MEK is stored in the range key database 108. The timestamp in the timestamp slot 412 may be updated to indicate the time the wrapped MEK was stored. The updated timestamp may be provided by the SED 102 during the communication session or obtained by the key management server 106 from a trusted third party such as the TSA server. Contents in the slots 412-418 of the data structure 410 are then re-signed with the key management server signing key and the new signature stored in the digital signature slot 418.

At 510, the SED 102 closes the communication session with the key management server 106. The communication session may be closed for various reasons. The communication session may be closed after the wrapped MEK is stored in the range key database 108. Also, if one or more of the received hash or the digital signature from the key management server 106 are not verified, then the wrapped MEK is not stored in the range key database 108 because it may be in error and the communication session is closed. The communication session may be closed for other reasons as well and steps 502-510 may need to be performed again to store the MEK in the range key database 108, if the storage was not successful. Further one or more of steps 502-510 may be performed to store a plurality of MEKs in the data structure 410 associated with different ranges in the non-volatile storage media 112.

The examples above describe the eHSM 124 of the SED 102 generating the MEK which is then provided to the key management server 106. In other examples, the MEK may not be generated by the eHSM 124 of the SED 102. Instead the key management server 106 or other systems remote to the SED 102 may have one or more of an EBG and DRBG to generate the MEK which is then stored on the key management server 106. In this regard, one or more of steps 306 or 508 may not be performed, also reducing complexity of the SED 102. Yet other variations are also possible for how the MEK is generated which is then stored in the data structure 410.

Figure 6:
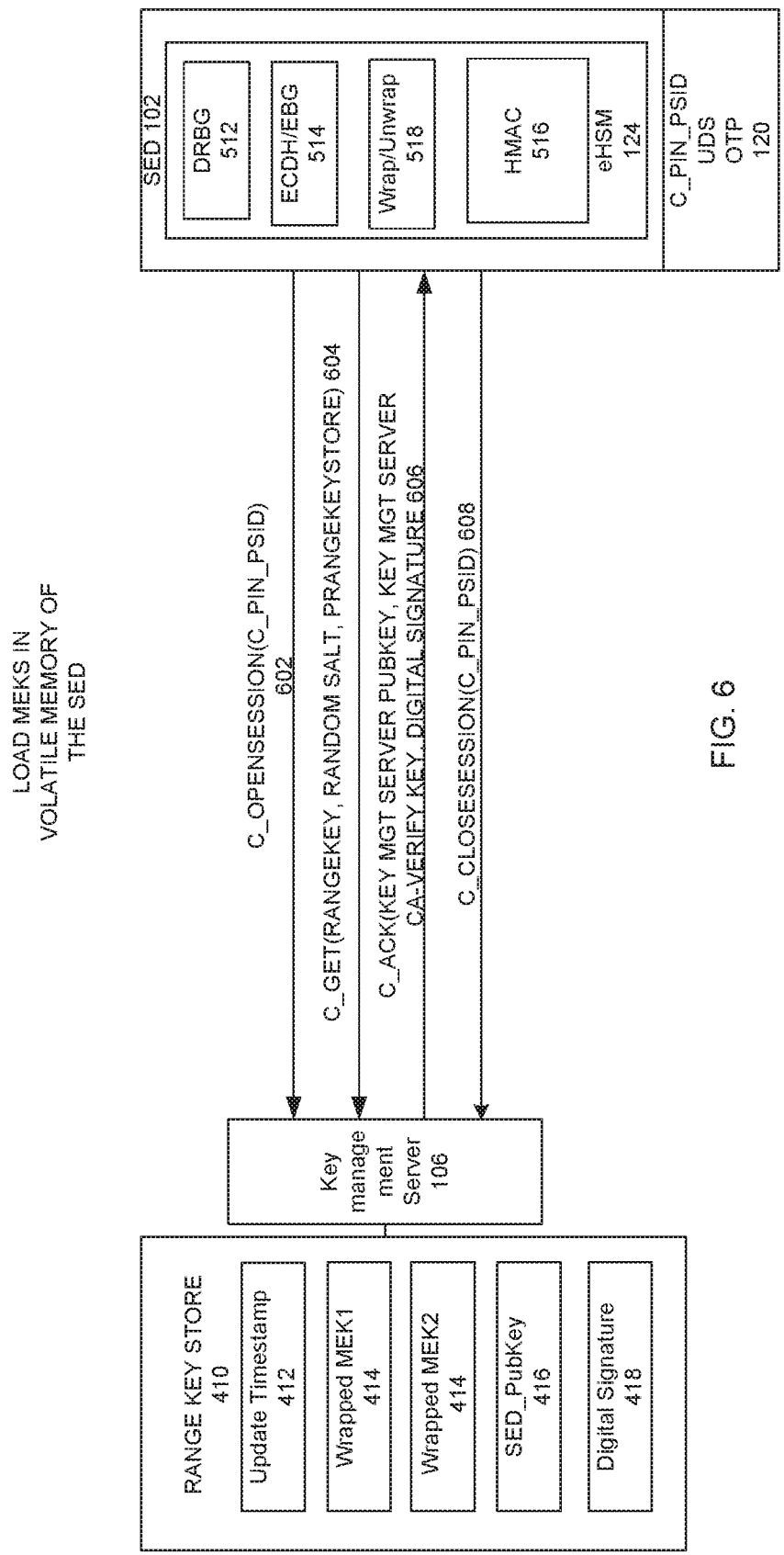
FIG. 6 illustrates example details associated with providing the MEK from the range key database to the SED to facilitate encryption and decryption operations on the SED.

FIG. 6 illustrates example details associated with providing the MEKs from the range key database 108 to the SED 102 to facilitate encryption and decryption operations on the SED 102. The MEKs may be loaded on the SED 102 only in the volatile memory 130 of the SED 102 upon power on the SED 102 and not stored on the non-volatile storage media 112 to preserve security of the encrypted data on the non-volatile storage media of the SED 102. The loading may include communication between the key management server 106 and eHSM 124 of the SED 102 which relates to at least step 308 in FIG. 3 and implemented by one or more of hardware, software, or a combination of hardware and software.

At 602, a request to open a secure communication session over the communication network 110 between the SED 102 and the key management server 106 is sent from the SED 102 to the key management server 106. The request may include the C_PIN_PSID of the SED 102 to identify the SED 102. The communication session is then opened.

At 604, the SED 102 sends a request to receive the MEKs stored in the range key database associated with the C_PIN_PSID. The request may include an indication to receive the MEK (i.e., rangekey), a random salt, and a pointer as where to deliver the MEKs (i.e., pRangeKeyStore). The key management server 106 may use the random salt to generate a shared session key for the communication session. The shared session key may be further based on a key management server private key and the SED_PubKey. The key management server 106 may use the received C_PIN_PSID to access the data structure 410 and obtain the SED_PubKey for generating the shared session key. The shared session key may allow for secure communication over the communication session. The timestamp in the timestamp slot 412 may be updated to indicate the time the MEKs is sent. The updated timestamp may be provided by the SED 102 during the communication session or obtained by the key management server 106 from a trusted third party such as the TSA server. Contents of the data structure 410 is then re-signed with the key management server signing key and the new signature stored in the digital signature slot 418. The key management server 106 then delivers the data structure 410 with the MEKs to the SED 102 based on pRangeKeyStore by encrypting the data structure 410 with the shared session key for transmission to the SED 102.

At 606, the key management server 106 may send an acknowledgement to the SED 102 that the MEKs were delivered. The acknowledgment may include the key management server public key and the key management server CA verify key and a digital signature over the key management server public key signed by the key management server CA signing key. The eHSM 124 may verify the key management server public key by verifying the digital signature with the received key management server CA Verify key and the digital certificate of the key management server maintained by the CA to confirm the key management server public key is from the key management server 106. Further, the eHSM 124 may use the ECDH algorithm 514 and the key management server public key, SED_PrivKey, and the random salt to generate the shared session key for the communication session. The eHSM 124 may use the shared session key to decrypt the data structure 410. Then, the eHSM 124 may use the key management server public key to verify the digital signature in the data structure 410. The MEKs received from the key management server 106 and stored in the data structure 410 may be protected by one or more encryption keys. If the digital signature is verified, then the wrapped MEKs are unwrapped, e.g., decrypted, with the UDS using the wrapping/unwrapping function 518 of the eHSM 124 and loaded into the volatile memory 130. Further, when the user associated with the range key provides a password such as a USER PIN, or the administrator provides a password such as a ADMIN_PIN, then the eHSM 124 may derive the wrapping key from the password using a PBKDF, unwrap, e.g., decrypt, the wrapped MEK and load the MEK into the encryption decryption engine 122 via the dedicated communication path 128. The encryption decryption engine 122 may now be arranged to encrypt data for storage on the non-volatile storage media 112 and decrypt data stored on the non-volatile storage media 112 for the user.

In examples, the eHSM 124 may also check the timestamp in the data structure 410 before storing the MEKs in the volatile memory 130. The eHSM 124 may determine a current timestamp from either the trusted TSA server or the timer counter register associated with the storage controller 132 which indicates the timestamp currently being issued by the TSA server or the timestamp currently being issued by the timer counter register. If the timestamp in the data structure 410 is within a certain duration of the current timestamp such as 24 hours, then the wrapped MEKs are stored in the volatile memory 130. If the timestamp in the data structure 410 is not within a certain duration of the current timestamp such as 24 hours, then the wrapped MEKs are not stored in the volatile memory 130 because MEKs are expired. The certain duration may be correlated to a physical distance between the key management server 106 and the SED 102 and negotiated during the SED registration 304 in some examples. Because the data structure 410 is sent over the communication network 110 between the key management server 106 to the eHSM 124 during the loading of the MEK to the volatile memory 130 at step 308, an unauthorized third party on the communication network 110 may be able to make a copy of this data structure 410 and later attempt to load it into the volatile memory 130 to decrypt the data stored in the SED 102. The checking of the timestamp by the eHSM 124 prevents the MEKs from being loaded once the timestamp is outside of the certain duration, securing the encrypted data on the non-volatile storage media 112 from the unauthorized third party.

At 608, the SED 102 closes the communication session with the key management server 106. The communication session may be closed for various reasons. The communication session is closed at 608 when the range key is stored in the volatile memory 130. Also, the communication session is closed at 608 if the timestamp associated with the MEKs and the current timestamp are outside the certain duration or the digital signature from the key management server 106 is not verified. The communication session may be closed for other reasons as well and steps 602-608 may need to be repeated to store an MEK in the volatile memory 130.

Because the MEK is stored on the SED 102 only in volatile memory 130 and not stored on the non-volatile media, all instances of the MEK on the SED 102 is removed each time the SED 102 is not powered resulting in the crypto-erase of the SED 102, securing the encrypted data on the non-volatile storage media 112. Decommissioning of the SED 102 also is simplified. Decommissioning of the SED 102 under National Institute of Standards and Technology (NIST) 800-88 guidelines involves removing all instances of the MEK on the SED 102 be deleted or changed when the SED 102 is decommissioned in order to protect the security of the encrypted data on the SED 102. In examples, the SED 102 may be decommissioned by removing power to the SED 102 which causes the MEKs in the SED to be deleted and deleting the MEKs in the data structure 410 stored in the range key database 108.

Figure 7:
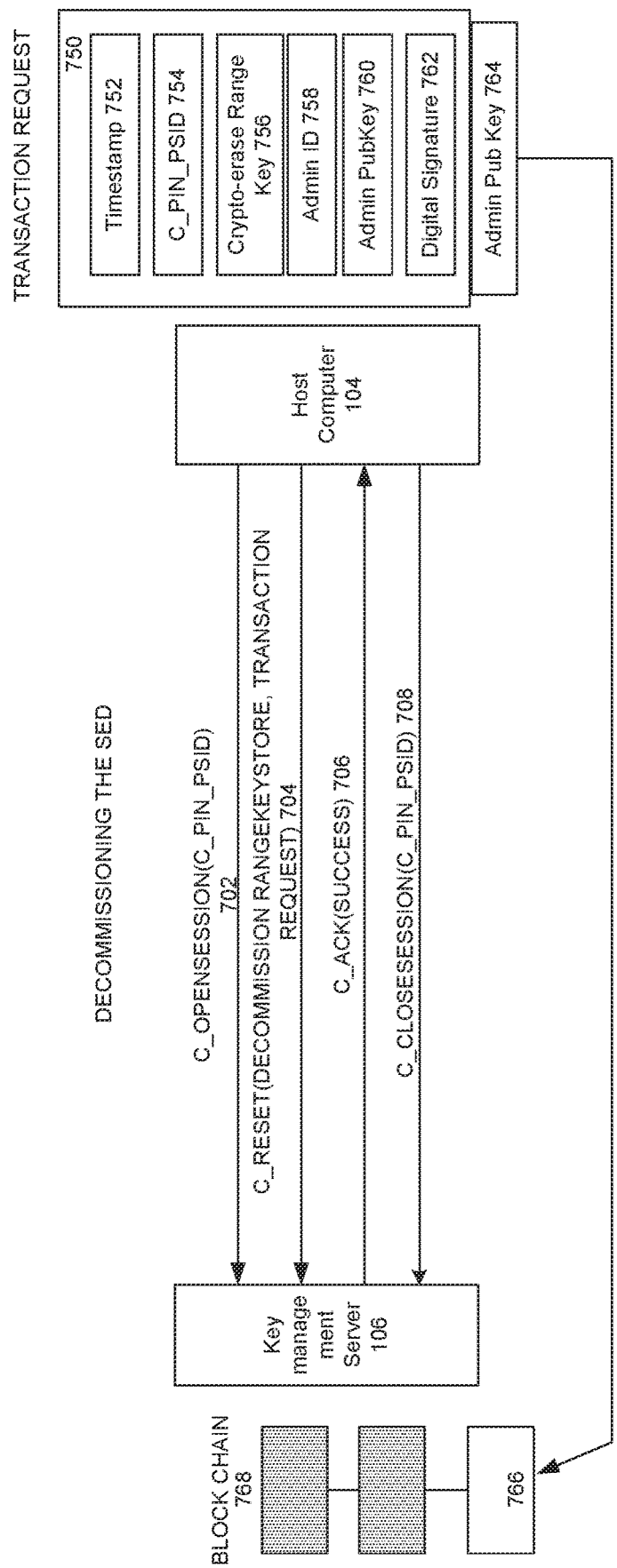
FIG. 7 illustrates an example process to memorialize decommissioning of the SED.

FIG. 7 illustrates an example process to memorialize decommissioning of the SED 102. The memorialization may include communication between the key management server 106 and the host computer 104 associated with the SED 102 and implemented by one or more of hardware, software, or a combination of hardware and software.

At 702, a request to open a communication session between the host computer 104 and the key management server 106 is sent from the host computer 104 to the key management server 106. The request may include identification of the SED 102 to decommission such as the C_PIN_PSID. The communication session is then opened.

At 704, a transaction request 750 is sent from the host computer 104 to the key management server 106 to decommission the SED 102. The transaction request 750 may include a plurality of fields 752-762 including one or more of a timestamp field 752 with a timestamp of the request, a SED field 754 with the C_PIN_PSID of the SED 102 to identify the SED 102 to decommission, and a crypto-erase range key field 756 which indicates that the SED 102 is to be decommissioned. The plurality of fields 752-762 may further include an administrator ID field 758 with an administrator ID to identify the administrator making the decommissioning request, a public key field 760 with a public key associated with the administrator, and a digital signature by an administrator signing key in the digital signature field 762 which signs contents in fields 752-760. The transaction request 750 may also include a digital certificate field 764 with a digital certificate of administrator that identifies the public key associated with the administrator and that the administrator has authority to decommission the SED 102.

At 706, the key management server 106 sends an indication that the transaction request 708 is verified. The verification is based on the digital signature in the digital signature field 762, the administrator public key in the public key field 760, and the administrator public key in the administrator public certificate managed by a CA.

The verified transaction request 750 is then stored in a block 766 of storage for subsequent access via the C_PIN_PSID. The block 766 may be 4 kilobytes (KB) such that 128 transaction requests may be filled in the block 766. Once the block 766 is filled (illustrated by shading), the block 766 may be signed with the key management server signing key and/or hashed and then chained into a block chain 768. The block chain 768 is a decentralized, distributed, and digital ledger that is used to record transactions across many computers so that any involved record cannot be altered retroactively. The block chain 768 may store the block 766 in a permissioned blockchain accessible to only recognized parties. Further, the key management server 106 may delete the data structure 410 stored in the range key database 108 so that the MEKs may not be loaded into the SED 102 to decrypt the encrypted data stored on the non-volatile storage media 112.

At 708, the host computer 104 closes the communication session with the key management server 106. The communication session may be closed for various reasons. The communication session is closed at 708 when the transaction request is stored in the block chain 768. Also, the communication session is closed at 708 if the transaction request is not stored in the block chain 768 because the transaction request 708 cannot be verified. The communication session may be closed for other reasons as well and steps 702-708 may need to be repeated to store the transaction request in the block chain 768.

In examples, the key management server 106 in FIG. 4-6 may use the block chain 768 to verify that any request including a C_PIN_PSID is not associated with an SED 102 which has been decommissioned. For example, if the key management server 106 receives a request to open a communication session with a C_PIN_PSID, the key management server 106 may check the block chain 768 to see if the SED 102 associated with the C_PIN_PSID is decommissioned. If the SED 102 is decommissioned, then the key management server 106 denies the communication session so that no MEKs are loaded onto the volatile memory 130 of the SED 102 because the SED 102 is decommissioned. This way the encrypted data in the decommissioned SED 102 is secured.

Further, the SED 102 may use the block chain 768 to determine whether to load MEKs into volatile memory 130.

Figure 8:
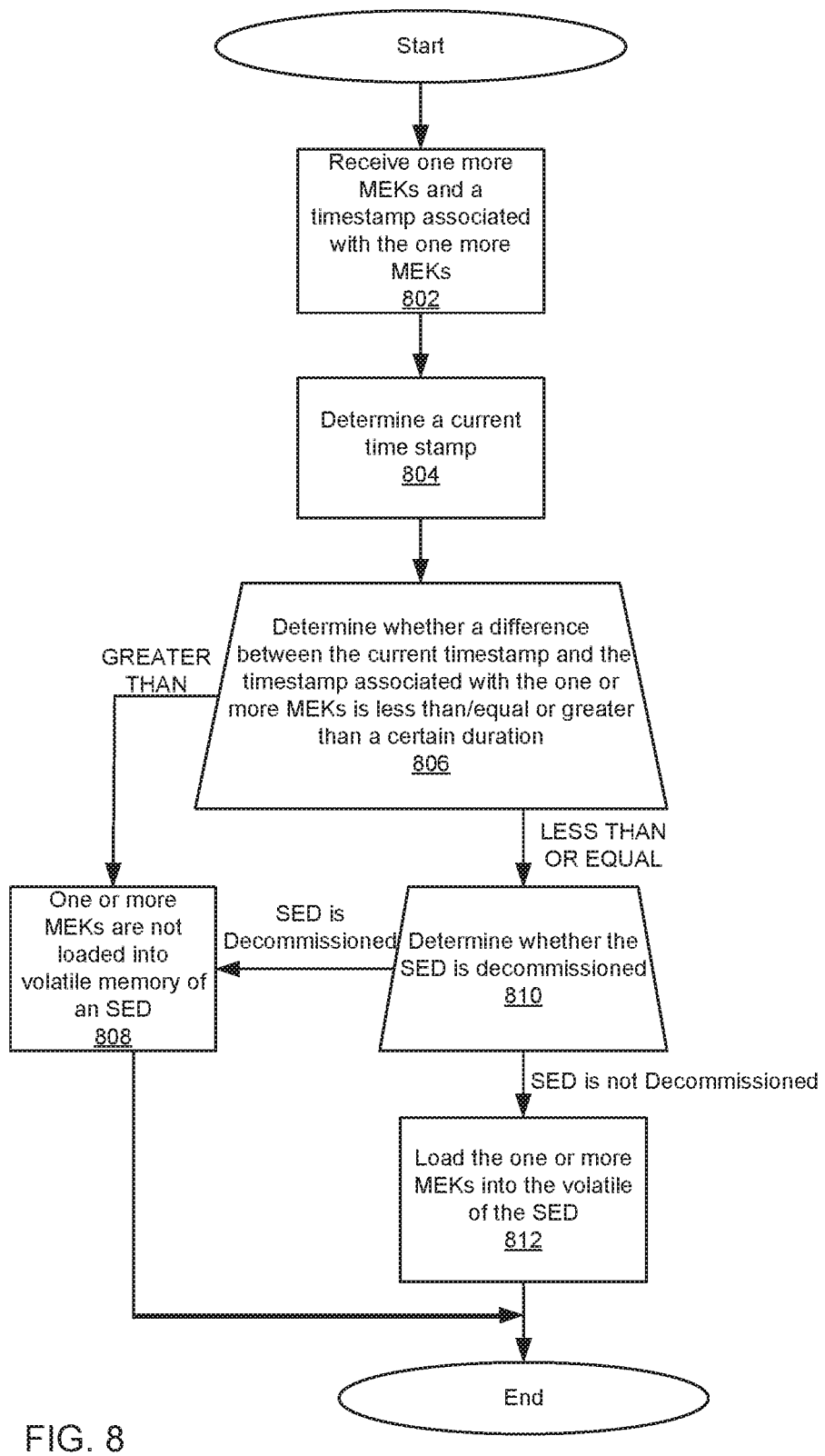
FIG. 8 is an example flow chart of functions associated with the SED storing the MEK in the volatile memory of the SED.

FIG. 8 is an example flow chart of functions 800 associated with the storage controller 132 of the SED 102 storing one or more MEKs in the volatile memory 130 of the SED 102 based on the block chain 768. The functions 800 may be performed by the SED 102 via the host computer 104, and in examples the storage controller 132 of the SED 102, by one or more of software, hardware, or a combination of software and hardware.

At 802, one or more MEKs and a timestamp associated with the one or more MEKs is received. Each of the MEKs may be associated with encrypting and decrypting data in a range on the non-volatile storage media 112 of the SED 102. In this regard, the MEKs may be range keys. In examples, the MEKs may be received by the eHSM 124 in a data structure 410 which is decrypted by a shared session key associated with a communication session and unwrapped by the UDS. The data structure 410 may include the timestamp which indicates a validity of the one or more MEKs. Each MEK of the MEKs may be still wrapped with a wrapping key based on a password of a user associated with the MEK.

At 804, a current timestamp is determined. The current timestamp may be provided by a same source as the timestamp in the data structure 410. For example, if the SED 102 provided the timestamp in the data structure 410, then the eHSM 124 may obtain the current timestamp from the timer counter register associated with the storage controller 132. Alternatively, if the TSA server provided the timestamp, then the eHSM 124 may obtain the current timestamp from the TSA server.

At 806, a determination is made whether a difference between the current timestamp and the timestamp associated with the one or more MEKs is less than or greater than a certain duration. The certain duration may be period of time that the one or more MEKs may be valid, and after this time the MEKs are no longer valid. By defining the certain duration, a third party who obtained an unauthorized copy of the MEKs may not be able to load the MEKs into the volatile memory 130 of the SED 102 after the certain duration because the MEKs are expired, so that the encrypted data stored in the non-volatile storage media 112 is secure.

At 808, the one or more MEKs are not loaded into a volatile memory 130 of an SED 102 if the difference is greater than the certain duration. The one or more MEKs are not loaded because they are not valid and likely being provided by the third party who obtained the unauthorized copy of the MEKs.

At 810, a determination is made whether the SED 102 has been decommissioned if the difference is less than or equal to the certain duration. The one or more MEKs may be valid, but the MEKs may still not be loaded into the volatile memory 130 if the SED 102 is decommissioned. The SED 102 may send a request to the key management server 106 with an identifier of the SED 102 such as the C_PIN_PSID of the SED 102 to determine whether the SED 102 is decommissioned. The key management server 106 may access the block chain 768 with the identifier to see whether a transaction request 750 associated with the SED 102 is stored in the block chain 768. If there is a transaction request associated with the identifier, then the SED 102 is decommissioned. Otherwise, the SED 102 is not decommissioned.

The key management server 106 may provide the indication of whether the SED 102 has been decommissioned to the eHSM 124.

At 812, the MEKs are loaded into the volatile memory 130 if the SED 102 has not been decommissioned. Further, when a user enters his password, the eHSM 124 may unwrap the MEKs to enable encryption and decryption of data in the range associated with the user.

At 808, the MEKs are not loaded into the volatile memory 130 if the SED 102 has been decommissioned. A third party may have obtained an unauthorized copy of the MEKs and may be attempting to load the MEKs into the decommissioned SED 102. The MEKs are not loaded, so that the encrypted data stored in the non-volatile storage media 112 is secure.

Example SED

Figure 9:
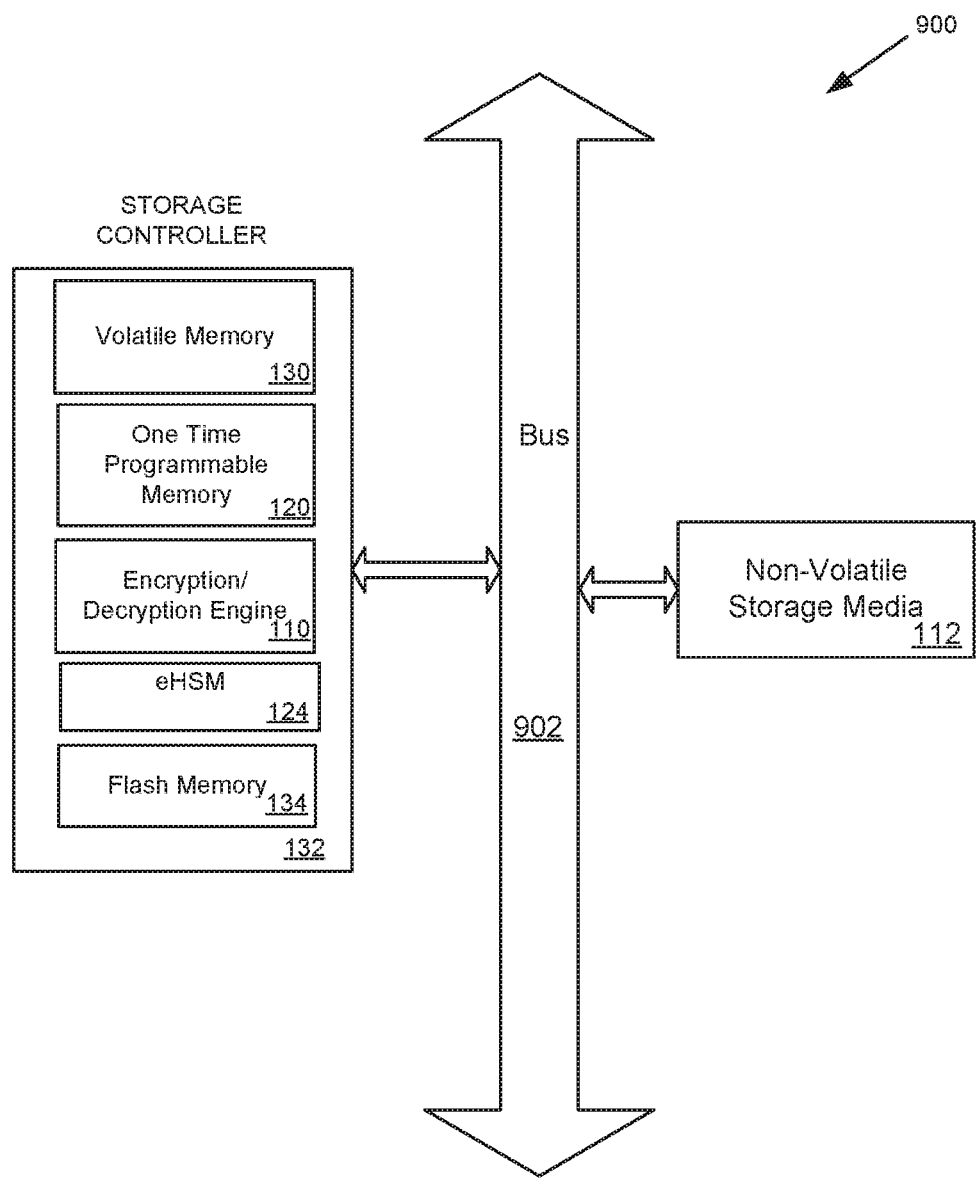
FIG. 9 is an example system diagram of the SED.

FIG. 9 is an example system diagram 900 of the SED 102. The example system diagram 900 includes the storage controller 132 with a volatile memory 130 for storing the MEK and OTP 120 for storing cryptographic keys. Additionally, the storage controller 132 may include an encryption decryption engine 122, flash memory 134, and the eHSM 124. The SED 102 may have a non-volatile storage media 112 for storing data in encrypted form received from the encryption decryption engine 122 and providing encrypted data stored on the non-volatile storage media 112 for decryption by the encryption decryption engine 122. The non-volatile storage media 112 or the flash memory 134 may not store the MEK.

The SED 102 also includes a bus 902 (e.g., Peripheral Component Interconnect (PCI), Industry Standard Architecture (ISA), PCI-Express, New Bus (NuBus), etc.) Coupled to the bus 802 may be the storage controller 132 and non-volatile storage media 112.

The SED 102 may implement any one of the previously described functionalities partially, (or entirely) in hardware and/or software (e.g., computer code, program instructions, program code, computer instructions) stored on a non-transitory machine readable medium/media such as the non-volatile storage media 112 for storage of the MEK on the SED 102 only in the volatile memory 130 of the SED 102.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for storing a media encryption key (MEK) in a self-encryption drive (SED) and crypto-erasing the self-encryption drive (SED) by deleting all instances of the media encryption key (MEK) stored by the self-encryption drive (SED), wherein the self-encryption drive (SED) comprises (i) a volatile memory and (ii) non-volatile storage media, the method comprising:
sending an identifier of the self-encryption drive (SED) to a key management server over a communication session between the self-encryption drive (SED) and the key management server; wherein the identifier uniquely identifies a data structure in a database associated with the key management server, wherein the data structure comprises a timestamp and the media encryption key (MEK);
receiving the data structure from the key management server, the data structure being wrapped with a shared session key associated with the communication session;
unwrapping the data structure with the shared session key;
storing the media encryption key (MEK) only in the volatile memory of the self-encryption drive (SED) based on the timestamp;
encrypting data for storage in the non-volatile storage media of the self-encryption drive (SED) based on the media encryption key (MEK) stored only in the volatile memory of the self-encryption drive (SED);
erasing the media encryption key (MEK) stored only in the volatile memory of the self-encryption drive (SED) to crypto-erase the self-encryption drive (SED),
wherein the timestamp corresponds to a time when the key management server sends the data structure to the SED; and
determining whether a difference between the timestamp associated with the MEK and a current timestamp is less than a certain duration and wherein storing the MEK only in the volatile memory of the SED comprises storing the MEK if the difference is less than the certain duration.

2. The method of claim 1, wherein unwrapping the data structure with the shared session key comprises verifying in the data structure a digital signature signed with a key management server signing key.

3. The method of claim 1, further comprising unwrapping the MEK stored in the data structure with a unique data secret (UDS) associated with the SED.

4. The method of claim 3, wherein the stored MEK in the volatile memory of the SED is wrapped with a wrapping key based on a password of a user of the SED and unwrapped with the wrapping key when the user provides the password to the SED.

5. The method of claim 1, wherein unwrapping the data structure with the shared session key comprises determining, by the SED, the shared session key based on a key management server public key received from the key management server, an SED private key, and a random salt.

6. The method of claim 1, further comprising accessing a block chain which stores an indication of whether the SED is decommissioned and wherein the MEK is stored only in the volatile memory of the SED if the indication indicates that the SED is not decommissioned.

7. A non-transitory computer-readable medium storing instructions for storing a media encryption key (MEK) in a self-encryption drive (SED) and crypto-erasing the self-encryption drive (SED) by deleting all instances of the media encryption key (MEK) stored by the self-encryption drive (SED), wherein the self-encryption drive (SED) comprises (i) a volatile memory and (ii) non-volatile storage media, the instructions when executed by one or more processors, cause the one or more processors to at least:
send an identifier of the self-encryption drive (SED) to a key management server over a communication session between the self-encryption drive (SED) and the key management server; wherein the identifier uniquely identifies a data structure in a database associated with the key management server, wherein the data structure comprises a timestamp and the media encryption key (MEK);
receive the data structure from the key management server, the data structure being wrapped with a shared session key associated with the communication session;
unwrap the data structure with the shared session key;
store the media encryption key (MEK) only in the volatile memory of the self-encryption drive (SED) based on the timestamp;
encrypt data for storage in the non-volatile storage media of the self-encryption drive (SED) based on the media encryption key (MEK) stored only in the volatile memory of the self-encryption drive (SED);

erase the media encryption key (MEK) stored only in the volatile memory of the self-encryption drive (SED) to crypto-erase the self-encryption drive (SED); and determine whether a difference between the timestamp associated with the MEK and a current timestamp is less than a certain duration and wherein the instructions to store the MEK only in the volatile memory of the SED comprises instructions to store the MEK if the difference is less than the certain duration.

8. The non-transitory computer-readable medium of claim 7, wherein the instructions to unwrap the data structure with the shared session key comprises instructions to verify a digital signature in the data structure signed with a key management server signing key.

9. The non-transitory computer-readable medium of claim 7, further comprising instructions to unwrap the MEK stored in the data structure with a unique data secret (UDS) associated with the SED.

10. The non-transitory computer-readable medium of claim 9, wherein the stored MEK in the volatile memory of the SED is wrapped with a wrapping key based on a password of a user of the SED and unwrapped with the wrapping key when the user provides the password to the SED.

11. The non-transitory computer-readable medium of claim 7, wherein the instructions to unwrap the data structure with the shared session key comprises instructions to determine, by the SED, the shared session key based on a key management server public key received from the key management server, an SED private key, and a random salt.

12. The non-transitory computer-readable medium of claim 7, wherein the timestamp corresponds to a time when the key management server sends the data structure to the SED.

13. A self-encryption drive (SED) arranged to store a media encryption key (MEK) in a self-encryption drive (SED) delete all instances of a media encryption key (MEK) stored by the self-encryption drive (SED) to crypto-erase the self-encryption drive (SED), the self-encryption drive (SED) comprising:

a volatile memory;
a non-volatile storage media;
instructions stored in memory of the self-encryption drive (SED), when executed by one or more processors of the self-encryption drive (SED), cause the self-encryption drive (SED) to at least:
send an identifier of the self-encryption drive (SED) to a key management server over a communication session between the self-encryption drive (SED) and the key management server; wherein the identifier uniquely identifies a data structure in a database associated with the key management server, wherein the data structure comprises a timestamp and the media encryption key (MEK);
receive the data structure from the key management server, the data structure being wrapped with a shared session key associated with the communication session;
unwrap the data structure with the shared session key;
store the media encryption key (MEK) only in the volatile memory of the self-encryption drive (SED) based on the timestamp;
encrypting data for storage in the non-volatile storage media of the self-encryption drive (SED) based on the media encryption key (MEK) stored only in the volatile memory of the self-encryption drive (SED);
erase the media encryption key (MEK) stored only in the volatile memory of the self-encryption drive (SED) to crypto-erase the self-encryption drive (SED); and
determine whether a difference between the timestamp associated with the MEK and a current timestamp is less than a certain duration and wherein the instructions to store the MEK only in the volatile memory of the SED comprises instructions to store the MEK if the difference is less than the certain duration.

14. The SED of claim 13, wherein the identifier is a physical security identification pin (PSID) associated with the SED.

15. The SED of claim 13, wherein the instructions to unwrap the data structure with the shared session key comprises instructions to verify a digital signature in the data structure signed with a key management server signing key.

16. The SED of claim 13, wherein the timestamp corresponds to a time when the key management server sends the data structure to the SED.

* * * * *